UNITED STATES PATENT OFFICE 3,733,354
Patented May 15, 1973

3,733,354
PROCESS FOR THE PREPARATION OF CAR-
BOXYLATED AROMATIC COMPOUNDS
Luigi Cassar and Marco Foa, Novara, Italy, assignors
to Montecatini Edison S.p.A., Milan, Italy
No Drawing. Filed Oct. 16, 1970, Ser. No. 81,624
Claims priority, application Italy, Oct. 20, 1969,
23,584/69
Int. Cl. C07c 63/00
U.S. Cl. 260—515 R                                    8 Claims

ABSTRACT OF THE DISCLOSURE

A process is disclosed for the preparation of carboxylated aromatic compounds by the reaction of simple or substituted aromatic chlorides, bromides and iodides, with carbon monoxide and a compound containing activated hydrogen selected from the class consisting of water, alcohols and amines, and in the presence of nickel-tetracarbonyl, wherein the reaction is carried out in an organic solvent medium having a high dielectric constant, in the presence of a basic compound, under substantially ambient pressure, and at a temperature between 20° and 130° C.

---

The present invention relates to an improved process for the preparation of carboxylated aromatic compounds (i.e., carboxylic acids, salts, esters, amides) by reaction of aromatic chlorides, bromides and iodides with carbon monoxide and with compounds containing activated hydrogen, in the presence of nickel-tetracarbonyl.

The resulting compounds represent raw materials having important industrial applications. In fact, they are used in various technological fields such as, for instance, in the preparation of alkyd resins (benzoic acid), dyestuffs and pigments (naphthoic acid), azoic dyes (anthranilic acid), and plasticizers (high molecular weight alcohol esters of phthalic acid).

It is already known to carbonylate organic halides (chlorides, bromides iodides) in the presence of nickel-tetracarbonyl and compounds containing activated hydrogen. However, carbonylation of chlorides and bromides is possible only at high temperatures and pressures (about 300° C. and higher than 250 atm. respectively), because the introduction of the CO group is favored in the direction Cl→ Br→I, wherefore only the aromatic iodides can be carbonylated at ambient pressure.

These burdensome operational conditions adversely affect the economic aspects of these processes, often reducing their real industrial interest to a minimum.

Thus, it is an object of the present invention to provide a simple and cheap process for the preparation of carboxylated aromatic compounds, such as, for instance, carboxylic aromatic acids and their derivatives (salts, esters, amides) with a high degree of selectivity, starting from aromatic halides and in particular from aromatic chlorides and bromides.

This and still other objects, which will become clearer to those skilled in the art from the following description, are achieved, according to this invention, by a process for the preparation of carboxylated aromatic compounds, such as carboxylic aromatic acids and derivatives thereof (salts, esters, amides), by carbonylation of aromatic chlorides, bromides, iodides and derivatives thereof with carbon monoxide, in the presence of nickel-tetracarbonyl and a compound containing activated hydrogen, selected from the class consisting of water, alcohols and amines.

The process is characterized in that the reaction is carried out in a particular organic solvent medium having a high dielectric constant and in the presence of an organic or an inorganic base, substantially at ambient pressure and at temperatures between 20° C. and 130° C. and, if desired, in the presence of saline halides.

Suitable bases are inorganic bases such as NaOH, KOH, Ca(OH)$_2$, Mg(OH)$_2$, NH$_3$ and the like, or organic bases of the type NR$_3$, NHR$_2$, NH$_2$R, wherein R is a hydrocarbyl radical (alkyl, cycloalkyl, aryl radicals, etc.) having between 1 and 10 carbon atoms, or mixtures thereof. The base has also the function of blocking the hydrohalogen acid that forms during the reaction.

The saline halides consist of those having a cation selected from the class consisting of Na$^+$, K$^+$, Li$^+$, Ca$^{++}$, Mg$^{++}$, Ba$^{++}$, and NR$^+_4$, wherein R is a hydrocarbyl radical having from 1 to 10 carbon atoms, and an anion selected from the class consisting of Cl$^-$, Br$^-$ and I$^-$; and moreover, they must be at least partly soluble in the reaction medium.

The carbonylation reaction may be schematically represented by the following equation:

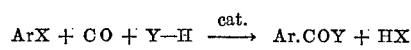

$$\text{ArX} + \text{CO} + \text{Y—H} \xrightarrow{\text{cat.}} \text{Ar.COY} + \text{HX}$$

wherein
Ar is an aryl radical consisting of from 1 to 4 benzene rings connected together in any manner;
X is a halogen selected from the class consisting of Cl, Br and I;
Y—H is a compound containing activated H; and
Y represents: —OH, —OR, —NR$_2$, —NHR, where R is a hydrocarbyl radical having from 1 to 10 carbon atoms.

The aryl radicals may, in turn, contain various constituents such as halogens (Cl, Br. I), alkyl—, —COOH carboxyl—, —COOR' alkoxy-carbonyl—, —COR' acyl—, —OH hydroxyl groups, —OR' alkoxyl—, amino-NH$_2$, alkylamino-NHR', dialkylamino-NR'$_2$, amido-CONH$_2$ and CONR'$_2$, nitrilo-CN, sulphoxy-SOR', SO$_2$R',-sulphone groups etc. wherein R' is a hydrocarbyl group having from 1 to 10 carbon atoms.

As the reaction medium one may use various organic solvents such as saturated esters, alkano-nitriles (such as acetonitrile), saturated amides (such as hexamethyl-phosphoramide and dimethyl-formamide), dialkyl-ureas, sulphoxides (such as dimethyl-sulphoxide). Preferably, solvents are used having a high dielectric constant, i.e., more than 30 Debye.

The reaction is carried out by using from 1 to 10 moles of the Y—H compound containing activated hydrogen and from 1 to 10 moles of the basic compound per mole of aromatic halide ArX.

The concentration of the starting aromatic halide in the solvent is preferably kept between 5% and 20% by weight.

Finally, the nickel-tetracarbonyl is used in catalytic quantities.

The reaction temperature may vary from 20° to 130° C., but, when starting from aromatic chlorides, it is preferably between 70° and 120° C. The pressure is kept at substantially atmospheric.

The process may be carried out either continuously or batchwise. According to a prefered embodiment, the reaction is carried out by feeding all the reactants into the solvent under a carbon monoxide head and under atmospheric or substantially atmospheric pressure.

At the end of the reaction, as revealed by the stopping of the absorbtion of the CO or by the constant composition of the raw product, water is admixed with the reaction mixture and the organic compounds are extracted with a solvent according to per se known methods.

The process, due to its mild operational conditions, proves to be particularly advantageous. A special advantage is represented by its high selectivity in terms of yields of the desired product.

Finally, still another advantage is represented by the possibility of employing raw materials (aromatic chlorides and bromides) which are cheap in comparison to the aromatic iodides.

The invention will now be illustrated in still greater detail by the following non-limiting examples:

EXAMPLE I

Into a reactor consisting of a 250 cc. flask fitted with a stirrer, a feeding funnel for the liquids, a thermometer and a water cooler, and connected with a Mariotte bottle containing carbon monoxide, there were introduced 90 cc. of dimethyl-sulphoxide, 9 cc. of water, 5.5 g. of KOH, 10 cc. of triethylamine, and 3.0 cc. of nickeltetracarbonyl.

The temperature was then brought up to 97° C. and 10 g. of bromobenzene were added. The reaction mixture was then maintained at 98° C. for 7 hours while adding dropwise during this period 3.5 g. of KOH.

From the moment the bromobenzene was added, there were absorbed 1100 cc. of carbon monoxide.

At the end of the reaction to the reaction mixture there were added 300 cc. of water and it was then extracted with ethyl ether. The acidic part was then separated from the ethereal extract by washing with an aqueous sodium bicarbonate solution. The resulting bicarbonate solution was acidified with concentrated HCl and extracted with ethyl ether.

The ethereal extract was then brought to dryness, thereby obtaining a residue of 5.0 g. of benzoic acid. The neutral fraction consisted of 2.0 g. of bromobenzene and 0.7 g. of benzene.

The yield in benzoic acid with respect to the converted bromobenzene amounted to 80.5%.

EXAMPLE II

Into a 100 cc. flask equipped in the manner described in Example I, there were introduced 30 cc. of dimethyl-sulphoxide, 1.4 cc. of water, 1.2 cc. of nickeltetracarbonyl, 1.4 g. of calcium oxide, 1.2 g. of NaBr, and 3.9 g. of 1-chloro-naphthalene. The whole was then brought up to a temperature of from 105° to 110° C. and was kept at this temperature while stirring for 12 hours under a CO head.

Thereupon the raw product was worked up as in Example I, Thereby obtaining 3.8 g. of 1-naphthoic acid.

The neutral fraction (0.1 g.) consisted of naphthalene and 1-chloronaphthalene.

The yield in naphthoic acid with respect to the converted starting product amounted to 93.4%.

EXAMPLE III

Into a 100 cc. flask equipped in the manner described in Example I, there were introduced 30 cc. of dimethyl-sulphoxide, 1.4 cc. of water, 1.2 cc. of nickeltetracarbonyl, 1.4 g. of CaO, 2.5 g. of benzyl-trimethyl-ammonium chloride, $C_6H_5 \cdot CH_2 \cdot N(CH_3)_3 \cdot Cl$, and 3.9 g. of 1-chloronaphthalene.

Thereupon the temperature was brought up to 105°–110° C. and the mixture was kept at this temperature while stirring for 7 hours under a CO head.

The raw product was then worked up as in Example I, thereby obtaining 3.7 g. of 1-naphthoic acid.

The neutral fraction (0.3 g.) consisted of naphthalene (0.15 g.) and 1-chloronaphthalene (0.15 g.).

The yield in naphthoic acid with respect to the converted starting product amounted to 93%.

EXAMPLE IV

Into a 100 cc. flask equipped in the manner described in Example I, there were introduced 45 cc. of dimethyl-sulphoxide, 2.2 cc. of methanol, 1.8 cc. of nickeltetracarbonyl, 1.7 g. of sodium bromide, 3.3 cc. of triethylamine, and 5.0 g. of bromobenzene. This mixture was then brought up to a temperature of 100° C. and was kept at this temperature for 6 hours under a CO head.

The raw product was then worked up as in Example I, thereby obtaining 1.2 g. of benzoic acid.

The neutral fraction contained 2.8 g. of methyl benzoate.

The total yield in carboxylated products amounted to 96% with respect to the converted starting product.

EXAMPLE V

Into a 100 cc. flask equipped in the manner described in Example I, there were introduced 95 cc. of dimethyl-formamide, $H \cdot CO \cdot NMe_2$, 5 cc. of water, 10 cc. of triethylamine, 1.0 g. of NaOH, and 4.0 cc. of nickeltetracarbonyl. This mixture was then brought up to 54° C. and to this there were admixed 10 g. of bromobenzene. The mixture was then kept at 54° C. for 2 hours while adding slowly 7.0 cc. of triethylamine.

Thereupon the raw product was worked up as in Example I, thereby obtaining 6.3 g. of benzoic acid.

The neutral fraction contained 0.3 g. of benzene and 1.2 g. of bromo-benzene.

The yield in benzoic acid with respect to the converted starting product amounted to 92%.

EXAMPLE VI

Into a 100 cc. flask equipped in the manner described in Example I, there were introduced 2.5 cc. of water, 47.5 cc. of hexamethyl-phosphoramide, 5 cc. of triethylamine, 0.5 g. of NaOH, 2.0 cc. of nickeltetracarbonyl and 5.0 g. of 1-chloronaphthalene. Thereupon the temperature was raised up to 100° C. and was kept at this value for 22 hours, under a CO head.

The raw product was then worked up as in Example I, thereby obtaining 2.6 g. of 1-naphthoic acid.

The neutral fraction contained 1.3 g. of naphthalene and 0.85 g. of 1-chloronaphthalene.

The yield in 1-naphthoic acid with respect to the converted 1-chloronaphthalene amounted thus to 59.5%.

EXAMPLE VII

Into a 100 cc. flask equipped in the manner described in Example I, there were introduced 0.6 cc. of water, 40 cc. of hexamethyl-phosphoramide, 11.0 cc. of hexylamine, 2.5 cc. of nickeltetracarbonyl, and 5.0 g. of 1-chloronaphthalene. Thereupon the temperature was raised up to 110° C. and was then kept at this value for 34 hours, under a CO head.

The raw product was then worked up as in Example I, thereby obtaining 2.7 g. of 1-naphthoic acid.

The neutral fraction contained 1.2 g. of N-hexyl-1 naphthoylamide, 0.8 g. of naphthalene and 0.6 g. of 1-chloronaphthalene.

The yields in naphthoic acid and in N-hexyl-1-naphthoylamide with respect to the coverted 1-chloro-naphthalene amounted, respectively, to 58% and 17%.

EXAMPLE VIII

Into a 100 cc. flask equipped in the manner described in Example I, there were introduced 55 cc. of dimethyl-sulphoxide, 2.1 cc. of water, 1.8 cc. of nickeltetracarbonyl, 3.2 g. of benzyl-trimethyl-ammonium chloride, 1.42 g. of calcium oxide, and 5 g. of bromo-mesitylene (bromo-2,4,6-trimethylbenzene). The temperature was then raised to 100°–110° C. and, while keeping the temperature at this value, the reaction mixture was kept for 13 hours with stirring under a CO head.

The raw product was then worked up as in Example I, thereby obtaining 2.4 g. of 2,4,6-trimethyl-benzoic acid.

The neutral fraction contained 1.7 g. of unreacted bromo-mesitylene.

The yield in 2,4,6-trimethyl-benzoic acid with respect to the reacted bromo-mesitylene amounted to 89%.

EXAMPLE IX

Into a 100 cc. flask equipped in the manner described in Example I, there were introduced 55 cc. of dimethyl-sulphoxide, 2.1 cc. of water, 1.8 cc. of nickeltetracarbonyl, 2.1 g. of calcium oxide, 3.2 g. of benzyl-trimethylammonium chloride, and 4.0 g. of o-chloro-benzoic acid. The temperature was then raised up to 110° C. and was maintained at this value for 15 hours under a CO head.

The raw reaction product, worked up as in Example I, contained 3.0 g. of phthalic acid, 0.12 g. of methyl benzoate and 1.0 g. of o-chloro-benzoic acid.

The yield in phthalic acid amounted to 88% with respect to the converted starting product.

EXAMPLE X

Into a 100 cc. flask equipped in the manner described in Example I, there were introduced 2.1 cc. of water, 50 cc. of dimethyl-sulphoxide, 1.5 g. of CaO, 1.8 cc. of nickeltetracarbonyl, 3.0 g. of benzyl-trimethyl-ammonium chloride, and 5.0 g. of o-bromoaniline.

The temperature was then brought up to 114° C. and was kept at this value for 5 hours under a CO head. From the moment the mixture attained this temperature (114° C.), there were absorbed 700 cc. of carbon monoxide.

At the end of the test the dimethyl-sulphoxide was recovered by distillation under vacuum (20 torr). To the residue there were then added 300 cc. of water and the mixture was brought up to a pH of 5-6 with diluted HCl, whereupon it was extracted with ethyl ether (3 times with 100 cc.). The ethereal extract was then dried over $Na_2SO_4$ and evaporated. The residue of the ethereal extract (3.9 g.) consisted mainly of o-amino-benzoic acid (anthranilic acid) (3.0 g.).

The yield in anthranilic acid amounted to 84% with respect to the converted starting product.

EXAMPLE XI

Into a 100 cc. flask equipped in the manner described in Example I, there were introduced 2.0 cc. of water, 60 cc. of dimethyl-sulphoxide, 1.5 g. of nickeltetracarbonyl, 1.5 g. of CaO, 3.0 g. of benzyl-trimethyl-ammonium chloride, and 4.85 g. of p-bromo-acetophenone. The temperature was then raised to 99° C. and was kept at this value for 3 hours.

Then the Example I procedure was followed, thereby obtaining 2.8 g. of p-acetyl-benzoic acid.

The neutral fraction (0.9 g.) contained 0.7 g. of acetophenone and 0.2 g. of o-chloro-acetophenone.

The yield in p-acetyl-benzoic acid amounted to 70% with respect to the converted starting product.

EXAMPLE XII

Into a 100 cc. flask equipped in the manner described in Example I, there were introduced 2.1 cc. of water, 1.8 cc. of nickeltetracarbonyl, 1.5 g. of CaO, 3.2 g. of benzyl-trimethyl-ammonium chloride, 55 cc. of dimethyl-sulphoxide, and 5.0 g. of 2-bromo-anisole. The temperature was then raised up to 110° C. and was kept at this value for 3 hours under a CO head.

Thereupon Example I procedure was followed, thereby obtaining 2.2 g. of o-methoxy-benzoic acid.

The yield in o-methoxy-benzoic acid amounted to 55% with respect to the converted starting product.

What is claimed is:

1. In a process for the preparation of carboxylated aromatic compounds by the reaction of simple or substituted hydrocarbon aromatic chlorides, bromides and iodides, wherein the halo substituent is attached to a nuclear carbon atom
   with carbon monoxide and
   a compound containing activated hydrogen selected from the group consisting of water, alcohols and amines, and
   in the presence of nickel-tetracarbonyl, the improvement wherein the reaction is carried out in an organic solvent medium having a dielectric constant of not less than 30 Debye and selected from the group consisting of saturated esters, alkane-nitriles, saturated amides, dialkyl ureas and sulphoxides
   in the presence of a basic compound selected from the group consisting of NaOH, KOH, $Ca(OH)_2$, $NH_3$ and an amine of the general formula $NHR_2$, $NH_2R$ and $NR_3$, wherein R is a hydrocarbyl radical having 1 to 10 carbon atoms
   under substantially ambient pressure, and
   at a temperature between 20° and 130° C.

2. The process of claim 1 wherein said organic solvent medium is dimethylsulfoxide.

3. The process of claim 1 wherein said organic solvent medium is dimethylformamide.

4. The process of claim 1 wherein said organic solvent medium is hexamethyl phosphoramide.

5. A process according to claim 1, wherein the reaction is carried out in the presence of saline halides.

6. A process according to claim 1, wherein there are used from 1 to 10 moles of the reactant containing activated hydrogen and from 1 to 10 moles of the basic compound per mole of the aromatic halide.

7. A process according to claim 1, wherein the aromatic halide is an aromatic chloride and the temperature of reaction is maintained between 70° C. and 120° C.

8. A process according to preceding claim 1, wherein the concentration of the aromatic halide in the solvent is maintained between 5% and 20% by weight.

References Cited

UNITED STATES PATENTS

| 2,914,554 | 6/1960 | Kroeper et al. | 260—515 |

FOREIGN PATENTS

| 1,161,203 | 3/1958 | France | 260—515 |
| 1,052,974 | 3/1959 | Germany | 260—515 |

JAMES A. PATTEN, Primary Examiner

U.S. Cl. X.R.

260—465 D, 470, 471 R, 473 R, 475 R, 476 R, 515 A, 515 M, 515 P, 518 R, 521 R, 558 R, 559 R